(12) United States Patent
Carpenter et al.

(10) Patent No.: US 8,907,541 B2
(45) Date of Patent: Dec. 9, 2014

(54) SLOT LINER FOR ELECTRO-DYNAMIC MACHINE

(71) Applicant: Remy Technologies, L.L.C., Pendleton, IN (US)

(72) Inventors: George K. Carpenter, Anderson, IN (US); J. Paul Murphy, Greenfield, IN (US); Gregory Geoffrion, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 192 days.

(21) Appl. No.: 13/626,505

(22) Filed: Sep. 25, 2012

(65) Prior Publication Data

US 2014/0084740 A1    Mar. 27, 2014

(51) Int. Cl.
*H02K 15/10*    (2006.01)

(52) U.S. Cl.
CPC ..................................... *H02K 15/10* (2013.01)
USPC ......................................................... 310/215

(58) Field of Classification Search
None
See application file for complete search history.

(56) References Cited

U.S. PATENT DOCUMENTS

| | | |
|---|---|---|
| 1,661,355 A | 3/1928 | Baker |
| 2,180,983 A | 11/1939 | Hall |
| 2,340,291 A | 2/1944 | Wirtz |
| 3,150,280 A | 9/1964 | Little |
| 3,254,394 A | 6/1966 | Roberts |
| 3,745,394 A | 7/1973 | Mason |
| 3,748,511 A | 7/1973 | Crabb |
| 3,862,492 A | 1/1975 | Crabb |
| 3,917,967 A | 11/1975 | Robison et al. |
| 4,151,436 A | 4/1979 | Smith |
| 4,217,690 A | 8/1980 | Morreale |
| 4,247,978 A | 2/1981 | Smith |
| 4,274,025 A | 6/1981 | Nerurkar et al. |
| 4,400,639 A | 8/1983 | Kobayashi et al. |
| 4,594,771 A | 6/1986 | Appenzeller et al. |
| 4,594,775 A | 6/1986 | Stanley |
| 4,788,761 A | 12/1988 | Crawford et al. |
| 5,068,563 A | 11/1991 | Cummings |
| 5,306,976 A * | 4/1994 | Beckman ....................... 310/215 |
| 5,479,061 A | 12/1995 | Bobbio et al. |
| 5,763,978 A | 6/1998 | Uchida et al. |
| 5,877,574 A | 3/1999 | Molnar |
| 5,989,684 A | 11/1999 | Hazelton et al. |
| 6,065,204 A | 5/2000 | DeHart |
| 6,094,807 A | 8/2000 | Davis et al. |
| 6,147,430 A * | 11/2000 | Kusase et al. ................. 310/215 |
| 6,191,508 B1 | 2/2001 | Aoki et al. |

(Continued)

FOREIGN PATENT DOCUMENTS

| | | |
|---|---|---|
| EP | 1065778 A2 | 1/2001 |
| WO | 2006007425 A1 | 1/2006 |
| WO | 2007126568 A2 | 11/2007 |

*Primary Examiner* — Tran Nguyen
(74) *Attorney, Agent, or Firm* — Cantor Colburn LLP

(57) ABSTRACT

A slot liner is configured for association with a tooth of an electro-dynamic machine core having an annular rim and circumferentially spaced teeth radially extending from the annular rim. The slot liner includes sidewalls configured to line circumferential surfaces of the tooth, first and second tabs formed by bends in the sidewalls, the first tab being configured to line a portion of the annular rim adjacent to the tooth and the second tab being configured to overlap with a tab of an adjacent slot liner and a retainer configured to retain the sidewalls against a radially inward portion of the tooth.

20 Claims, 2 Drawing Sheets

(56) References Cited

U.S. PATENT DOCUMENTS

| | | | |
|---|---|---|---|
| 6,242,836 B1 * | 6/2001 | Ishida et al. ............... 310/215 |
| 6,400,056 B1 * | 6/2002 | Naka et al. ................ 310/215 |
| 6,504,282 B2 | 1/2003 | Lee |
| 6,618,928 B1 | 9/2003 | DeHart |
| 6,633,102 B2 | 10/2003 | Nagai et al. |
| 6,674,211 B2 * | 1/2004 | Katou et al. ............... 310/215 |
| 6,741,004 B2 | 5/2004 | Senoo et al. |
| 6,806,614 B2 | 10/2004 | Kuroyanagi et al. |
| 6,873,082 B2 | 3/2005 | Neet |
| 6,900,572 B2 | 5/2005 | Omura |
| 6,972,506 B2 * | 12/2005 | Onishi ...................... 310/215 |
| 6,995,491 B2 | 2/2006 | Kimura et al. |
| 7,250,700 B2 | 7/2007 | Maki-Ontto |
| 7,352,098 B2 | 4/2008 | Suzuki et al. |
| 7,367,106 B2 | 5/2008 | Becherucci et al. |
| 7,489,061 B2 | 2/2009 | Nishimura |
| 7,649,295 B2 | 1/2010 | Fukui et al. |
| 7,743,483 B2 | 6/2010 | Tanaka et al. |
| 7,788,790 B2 | 9/2010 | Neet |
| 7,825,563 B2 | 11/2010 | Kotani et al. |
| 7,851,966 B2 | 12/2010 | Rippel |
| 7,919,896 B2 | 4/2011 | Takeshita et al. |
| 8,035,269 B2 | 10/2011 | Bottger et al. |
| 8,039,095 B2 | 10/2011 | Hollberg et al. |
| 8,049,390 B2 | 11/2011 | Kamibayashi et al. |
| 8,053,943 B2 | 11/2011 | Kamibayashi et al. |
| 8,076,818 B2 | 12/2011 | Sugishima et al. |
| 8,076,819 B2 | 12/2011 | Taema |
| 8,125,115 B2 | 2/2012 | Breden et al. |
| 8,129,880 B2 | 3/2012 | Rahman et al. |
| 8,169,119 B2 | 5/2012 | Eppler et al. |
| 8,169,120 B2 | 5/2012 | Kim et al. |
| 8,222,790 B2 | 7/2012 | Sakata |
| 2002/0014806 A1 | 2/2002 | Senoo et al. |
| 2006/0138877 A1 * | 6/2006 | Akabane ..................... 310/43 |
| 2009/0015094 A1 | 1/2009 | Yoshitake |
| 2009/0085422 A1 * | 4/2009 | Kusawake et al. ........... 310/216 |
| 2009/0224626 A1 | 9/2009 | Eppler et al. |
| 2010/0141079 A1 | 6/2010 | Chu et al. |
| 2011/0050026 A1 | 3/2011 | Kaiser et al. |
| 2012/0086299 A1 | 4/2012 | Hsu et al. |
| 2012/0153767 A1 | 6/2012 | Tang |
| 2012/0194028 A1 | 8/2012 | Rhoads et al. |

* cited by examiner

SLOT LINER FOR ELECTRO-DYNAMIC MACHINE

BACKGROUND OF THE INVENTION

The subject matter disclosed herein relates to a stator assembly for an electro-dynamic machine.

Electro-dynamic machines typically include a stator, conductive elements and a rotor. The stator is formed of laminations that are joined together to define an aperture in which the rotor is rotatably disposable and core slots. The conductive elements are supportively held in the core slots and are receptive of current to drive rotation of the rotor.

Although the conductive elements may include insulation provided about an electrically conductive material, additional insulation is often provided on the surfaces of the core slots.

BRIEF DESCRIPTION OF THE INVENTION

According to one aspect of the invention, a slot liner is configured for association with a tooth of an electro-dynamic machine core having an annular rim and circumferentially spaced teeth radially extending from the annular rim. The slot liner includes sidewalls configured to line circumferential surfaces of the tooth, first and second tabs formed by bends in the sidewalls, the first tab being configured to line a portion of the annular rim adjacent to the tooth and the second tab being configured to overlap with a tab of an adjacent slot liner and a retainer configured to retain the sidewalls against a radially inward portion of the tooth.

According to another aspect of the invention, an electro-dynamic machine core assembly includes an electro-dynamic machine core having an annular rim and circumferentially spaced teeth radially extending from the annular rim and a plurality of slot liners. Each slot liner is configured for association with a tooth of the core and includes sidewalls configured to line circumferential surfaces of the tooth, first and second tabs formed by bends in the sidewalls, the first tab being configured to line a portion of the annular rim adjacent to the tooth and the second tab being configured to overlap with a tab of a slot liner associated with an adjacent tooth and a retainer configured to retain the sidewalls against a radially inward portion of the tooth.

According to another aspect of the invention, a stator assembly for an electro-dynamic machine includes a substantially cylindrically-shaped core having an annular rim and a plurality of circumferentially spaced teeth radially extending from the annular rim with adjacent teeth defining slots such that each tooth is circumferentially sandwiched between first and second slots and a plurality of slot liners, each slot liner being disposed to cover a corresponding one of the teeth and including a first tab to cover a portion of the annular rim in the corresponding first slot and a second tab to overlap the first tab of an adjacent one of the slot liners in the corresponding second slot.

According to yet another aspect of the invention, a method of associating a slot liner with a tooth of an electro-dynamic machine core having an annular rim and circumferentially spaced teeth radially extending from the annular rim is provided. The method includes forming the slot liner with sidewalls and bending the sidewalls to form first and second tabs, axially inserting the slot liner into the core such that the sidewalls line circumferential surfaces of the tooth, the first tab lines a portion of the annular rim adjacent to the tooth and the second tab overlaps with a tab of an adjacent slot liner and retaining the sidewalls against a radially inward portion of the tooth.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Slot liners are disposed on teeth of an electro-dynamic machine core. The slot liners serve to ensure that there is proper insulation between the electrically conductive material of core windings and the material of the laminations used to form the core. In addition, the slot liners resist folding or similar damage during the radial insertion of the core windings and may be secured to the teeth by the core windings.

Figure 1:
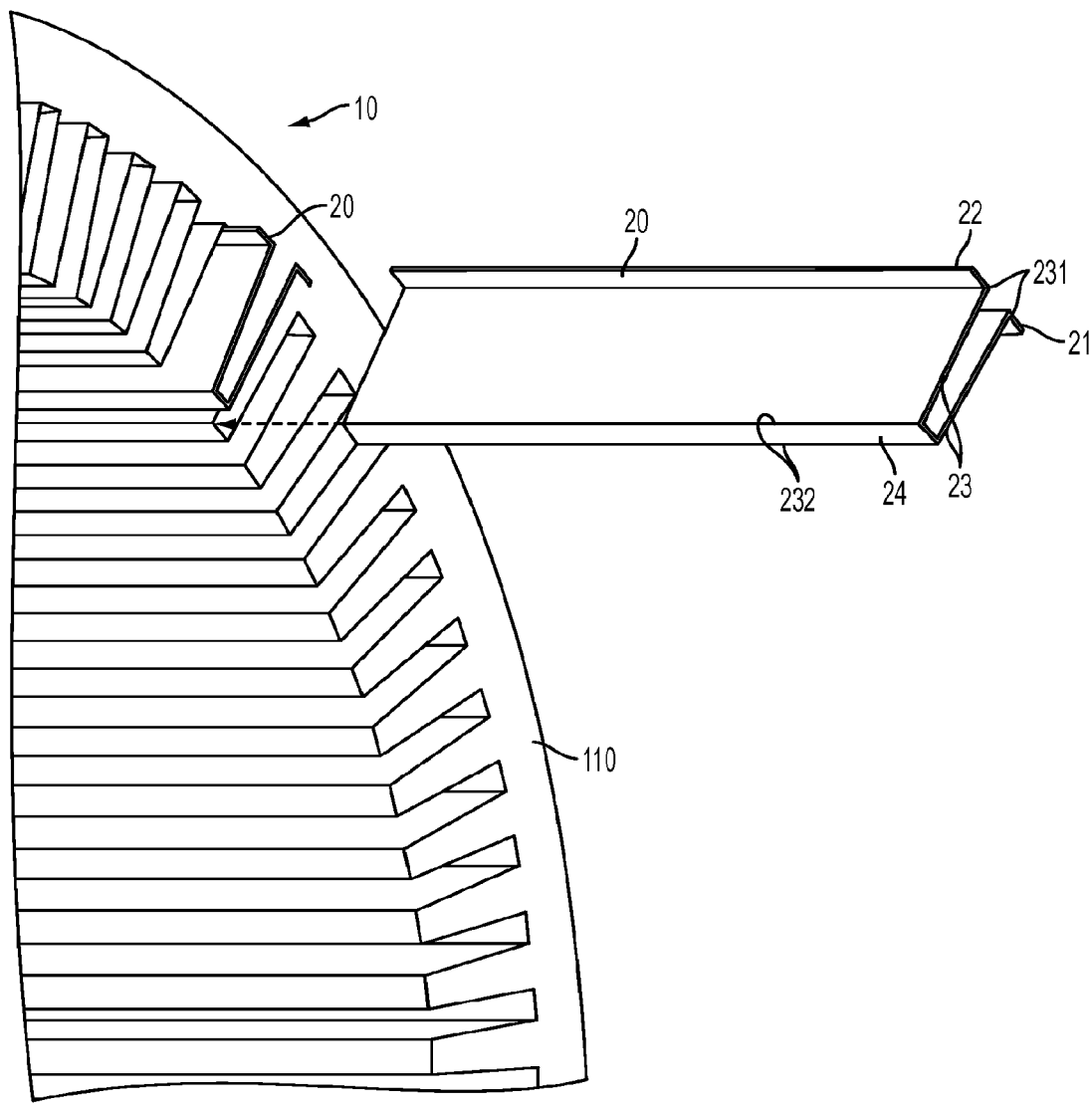
FIG. 1 is a perspective view of a stator assembly in accordance with embodiments.
Figure 2:
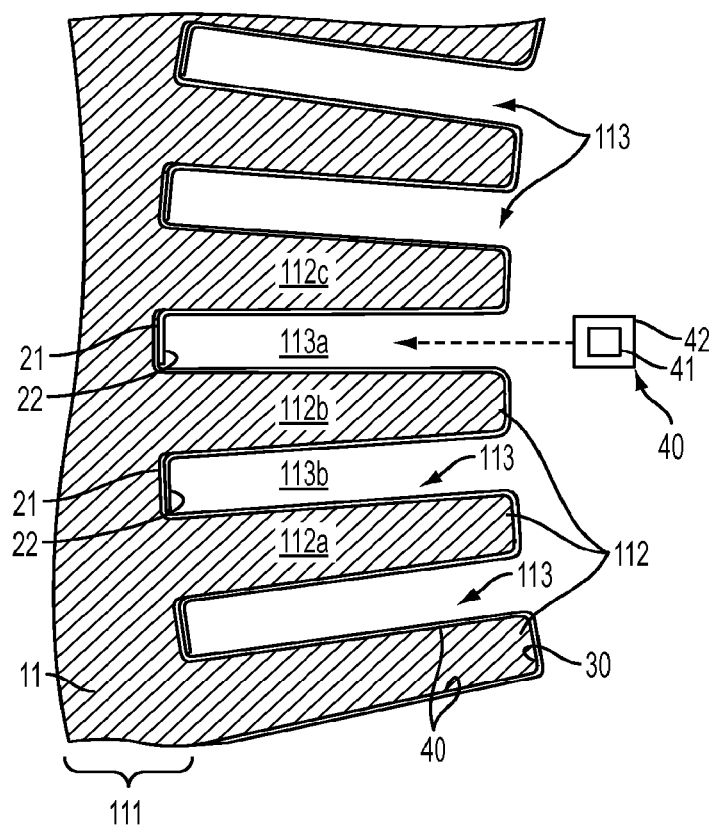
FIG. 2 is an enlarged axial view of the stator assembly of FIG. 1.

With reference to FIGS. 1 and 2, a stator assembly 10 for an electro-dynamic machine includes a core 11, a plurality of slot liners 20 and core windings 40. The core 11 is formed of conjoined laminations 110 and is substantially cylindrically-shaped. Thus, the core 11 extends axially between first and second opposite axial ends. The core 11 has an annular rim 111 with a plurality of circumferentially spaced teeth 112 extending radially inwardly from an inner diameter of the annular rim 111. Adjacent pairs of teeth 112 (e.g., teeth 112a and 112b) are formed to define slots 113 such that each individual tooth 112 is circumferentially sandwiched between first and second slots 113. That is, tooth 112b is sandwiched between first slot 113a and second slot 113b. The annular rim 111, the teeth 112 and the slots 113 extend axially between the first and second opposite axial ends of the core 11.

Each slot liner 20 may be formed from a single or monolithic piece of high temperature, dielectric material. This dielectric material may include, for example, Aramid™ fiber and/or other similar material(s). Each slot liner 20 is disposed to cover a corresponding one of the teeth 112 and includes first tab 21 and second tab 22, sidewalls 23 and a retainer 24. In accordance with embodiments, the sidewalls 23 may be formed by inward bends or folds of the retainer 24 and the first and second tabs 21 and 22 may be formed by outward bends or folds of the sidewalls 23.

The first tab 21 may be disposed to cover a portion of the inner diameter of the annular rim 111 in the corresponding first slot 113. The second tab 22 may be disposed to overlap the first tab 21 of an adjacent one of the slot liners 20 in the corresponding second slot 113. Thus, as shown in FIG. 2, the first tab 21 of the slot liner 20 covering tooth 112b covers the portion of the inner diameter of the annular rim 111 in the first slot 113a. The second tab 22 of the slot liner 20 covering tooth 112b covers the first tab 21 of the slot liner 20 covering tooth 112a in the second slot 113b.

It is to be understood that the numbering convention used above for the slots 113 is defined from the perspective of each tooth 112. Thus, the second slot 113*b* for tooth 112*b* is akin to the first slot 113*a* of the tooth 112*a* and the first slot 113*a* for tooth 112*b* is akin to the second slot 113*b* for the tooth 112*c*.

Each tooth 112 includes a radial face 30 and opposing circumferential surfaces 40. The radial face 30 faces radially inwardly in a similar manner as the inner diameter of the annular rim 111. The opposing circumferential surfaces 40 extend from the radial face 30 to the inner diameter of the annular rim 111 and slightly diverge from one another with increasing radial distance from the radial face 30. A shape of each of the slot liners 20 mimics that of the teeth 112.

The sidewalls 23 of each slot liner 20 are configured to line the opposing circumferential surfaces 40 of the corresponding tooth 112 and include first radially outward sidewall bends or folds 231 and second radially inward sidewall bends or folds 232. The first sidewalls bends or folds 231 are directed outward and away from one another to form the first and second tabs 21 and 22. The second sidewall bends or folds 232 are directed inward and toward one another and are formed on opposite sides of the retainer 24. The retainer 24 may be configured to line the radial face 30 of the corresponding tooth 112.

The core windings 40 include electrically conductive material 41 and a coating 42 and may be formed with a substantially rectangular shape that allows for limited clearance within each slot 113 in the circumferential direction. Multiple core windings 40 may be disposed in each slot 113.

During assembly processes, each slot liner 20 is formed with the first and second tabs 21 and 22, the sidewalls 23 and the retainer 24. As noted above, this may be accomplished by starting with a single or monolithic piece of material and inwardly bending or folding the material twice to define the sidewalls 23 and the retainer 24 between the sidewalls 23. The first and second tabs 21 and 22 are then defined by bending or folding the material of each of the sidewalls 23 outwardly.

Once formed, each slot liner 20 is inserted into the core 11 in an axial direction such that the sidewalls 23 line the circumferential surfaces 40 of the corresponding tooth 112, the first tab 21 lines a portion of the annular rim 111 adjacent to the corresponding tooth 112 and the second tab 22 overlaps with a tab of an adjacent slot liner. Each slot liner is then secured in the core 11 by the insertion of the core windings 40 into the slots 113. The insertion of the core windings 40 is conducted in the radial direction.

If not for the retainer 24, the insertion of the core windings 40 would tend to cause the second sidewall bends or folds 232 to bend or fold away from the circumferential surfaces 40. In accordance with the description provided above, however, the retainer 24 of each slot liner 20 resists such bending or folding and retains the second sidewall bends or folds 232 against a radially inward portion of the corresponding tooth 112. In accordance with further embodiments, the first and second sidewall bends or folds 231 and 232 may be angular, rounded or chamfered. Generally, the shape of the first and second sidewall bends or folds 231 and 232 will depend on the corresponding shapes of the corners of the teeth 112. That is, if the corners are chamfered, as shown in FIG. 2, the first and second sidewall bends or folds 231 and 232 may be similarly chamfered.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A slot liner configured for association with a tooth of an electro-dynamic machine core having an annular rim and circumferentially spaced teeth radially extending from the annular rim, the slot liner comprising:
   sidewalls configured to line circumferential surfaces of the tooth;
   first and second tabs formed by bends in the sidewalls, the first tab being configured to line a portion of the annular rim adjacent to the tooth and the second tab being configured to overlap with the first tab of an adjacent slot liner; and
   a retainer configured to retain the sidewalls against a radially inward portion of the tooth.

2. The slot liner according to claim 1, wherein the sidewalls, the first and second tabs and the retainer comprise a dielectric material.

3. The slot liner according to claim 1, wherein the sidewalls, the first and second tabs and the retainer extend along an entire axial length of the core.

4. An electro-dynamic machine core assembly, comprising:
   an electro-dynamic machine core having an annular rim and circumferentially spaced teeth radially extending from the annular rim; and
   a plurality of slot liners, each slot liner being configured for association with a tooth of the core and comprising:
   sidewalls configured to line circumferential surfaces of the tooth;
   first and second tabs formed by bends in the sidewalls, the first tab being configured to line a portion of the annular rim adjacent to the tooth and the second tab being configured to overlap with the first tab of a slot liner associated with an adjacent tooth; and
   a retainer configured to retain the sidewalls against a radially inward portion of the tooth.

5. The electro-dynamic machine core assembly according to claim 4, wherein the core comprises conjoined laminations.

6. The electro-dynamic machine core assembly according to claim 4, wherein the sidewalls, the first and second tabs and the retainer of each slot liner comprise a dielectric material.

7. The electro-dynamic machine core assembly according to claim 4, wherein the sidewalls, the first and second tabs and the retainer of each slot liner extend along an entire axial length of the core.

8. The electro-dynamic machine core assembly according to claim 4, wherein each tooth comprises a radial face from which the circumferential surfaces extend toward the annular rim.

9. The electro-dynamic machine core assembly according to claim 8, wherein the circumferential surfaces diverge with increasing radial distance from the radial face.

10. The electro-dynamic machine core assembly according to claim 8, wherein the retainer of each slot liner is configured to line the corresponding radial face.

11. The electro-dynamic machine core assembly according to claim 4, further comprising windings to secure the plurality of slot liners in the core.

12. A stator assembly for an electro-dynamic machine, comprising:

a substantially cylindrically-shaped core having an annular rim and a plurality of circumferentially spaced teeth radially extending from the annular rim with adjacent teeth defining slots such that each tooth is circumferentially sandwiched between first and second slots; and a plurality of slot liners, each slot liner being disposed to cover a corresponding one of the teeth and including a first tab to cover a portion of the annular rim in the corresponding first slot and a second tab to overlap the first tab of an adjacent one of the slot liners in the corresponding second slot.

13. The stator assembly according to claim 12, wherein the core comprises conjoined laminations.

14. The stator assembly according to claim 12, wherein the slot liners comprise dielectric material.

15. The stator assembly according to claim 12, wherein the core extends axially between first and second opposite axial ends, the teeth and the slots extending axially between the first and the second opposite axial ends.

16. The stator assembly according to claim 12, wherein each tooth comprises:

a radial surface disposed to face radially inwardly; and opposing circumferential surfaces divergently extending from the radial face to the annular rim.

17. The stator assembly according to claim 16, wherein each slot liner comprises:

a retainer disposable to line the radial surface of a corresponding tooth; and sidewalls coupled to the retainer such that the sidewalls are disposable to line the opposing circumferential surfaces of the corresponding tooth, each of the sidewalls being bent to form the first and second tabs.

18. The stator assembly according to claim 12, further comprising windings to secure the plurality of slot liners in the core.

19. A method of associating a slot liner with a tooth of an electro-dynamic machine core having an annular rim and circumferentially spaced teeth radially extending from the annular rim, the method comprising:

forming the slot liner with sidewalls and bending the sidewalls to form first and second tabs;

axially inserting the slot liner into the core such that the sidewalls line circumferential surfaces of the tooth, the first tab lines a portion of the annular rim adjacent to the tooth and the second tab overlaps with the first tab of an adjacent slot liner; and retaining the sidewalls against a radially inward portion of the tooth.

20. The method according to claim 19, further comprising securing the slot liner in the core.

* * * * *